United States Patent
Musschoot

Patent Number: 6,155,404
Date of Patent: Dec. 5, 2000

[54] VIBRATORY CONVEYORS

[75] Inventor: Albert Musschoot, deceased, late of Marengo, Ill., by Paul Musschoot, executor

[73] Assignee: General Kinematics Corporation, Barrington, Ill.

[21] Appl. No.: 09/336,188

[22] Filed: Jun. 18, 1999

[51] Int. Cl.[7] .................................................. B65G 27/32
[52] U.S. Cl. ........................................ 198/753; 198/770
[58] Field of Search ..................................... 198/753, 770

[56] References Cited

U.S. PATENT DOCUMENTS

| | | | |
|---|---|---|---|
| 4,944,381 | 7/1990 | Riley | 198/370 |
| 5,713,457 | 2/1998 | Musschoot | 198/753 |
| 5,934,446 | 8/1999 | Thomson | 198/753 |
| 5,979,640 | 11/1999 | Horton | 198/770 |

*Primary Examiner*—Christopher P. Ellis
*Assistant Examiner*—Rashmi Sharma
*Attorney, Agent, or Firm*—Wood, Phillips, VanSanten, Clark & Mortimer

[57] ABSTRACT

A two-way drive for horizontally vibrating a feeder bed, including a reversible drive rotating one of two drive shafts rotatably connected so that the second drive shaft rotates at a speed which is a selected ratio (at least 2:1) of the speed of rotation of the first. A first eccentric weight is rotatably secured to the first drive shaft. A second eccentric weight is rotatably secured to the second drive shaft and movable between a first position on a first shaft radius when the second shaft is driven in one direction and a second position on a second shaft radius when the second shaft is driven in the reverse direction. The first and second shaft radii are spaced from each other so that the second eccentric weight in the first position is aligned with the first eccentric weight in one concurrent rotational position on one side of the drive shafts to provide a maximum force in one horizontal direction when driven in the one direction, and the second eccentric weight in the second position is aligned with the first eccentric weight in an opposite concurrent rotational position on the opposite side of the drive shafts to provide a maximum force in an opposite horizontal direction when driven in the reverse direction. In the highly preferred form, the selected ratio is 2:1 and the first and second shaft radii are spaced apart 180 degrees. Two stop members in a cylindrical cage on the second drive shaft selectively engage the second eccentric weight, one when in the first position and the other when in the second position. A longitudinally extending feeder bed is supported in a horizontal orientation by an assembly permitting horizontal movement of the feeder. The drive is connected to the feeder bed with its drive shafts generally horizontal and transverse to the longitudinal direction of the feeder. The drive-feeder connection transmits forces in a horizontal direction.

29 Claims, 2 Drawing Sheets

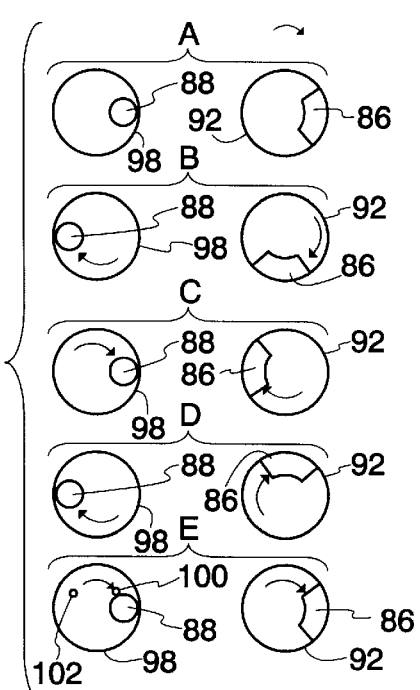
*Fig. 4*
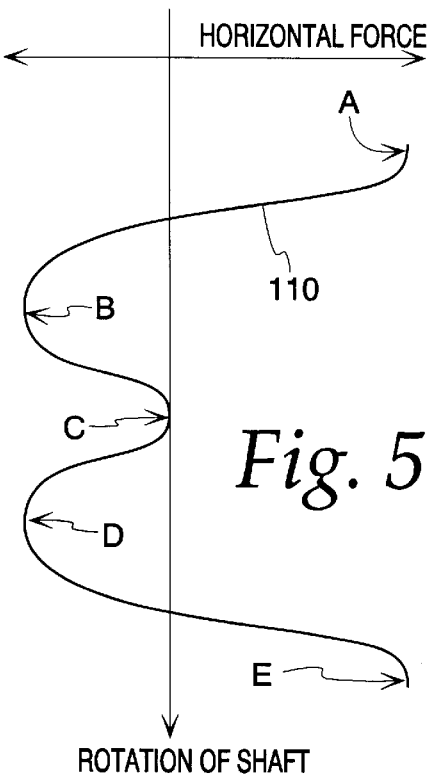
*Fig. 5*
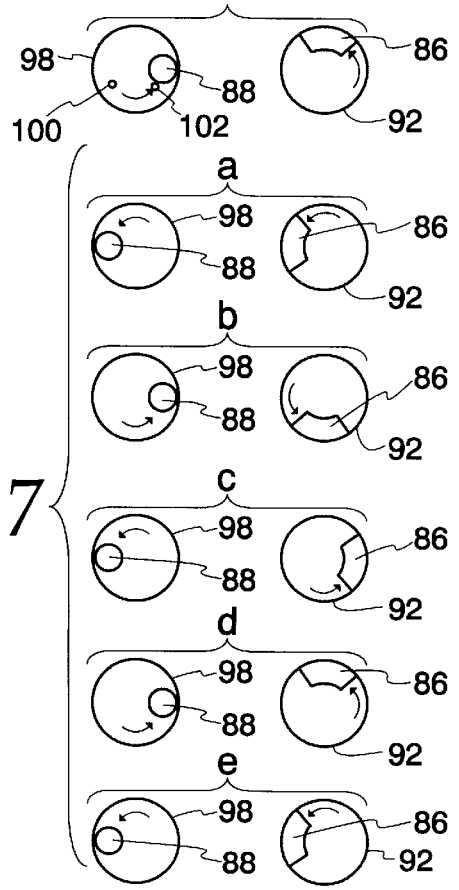
*Fig. 6*
*Fig. 7*
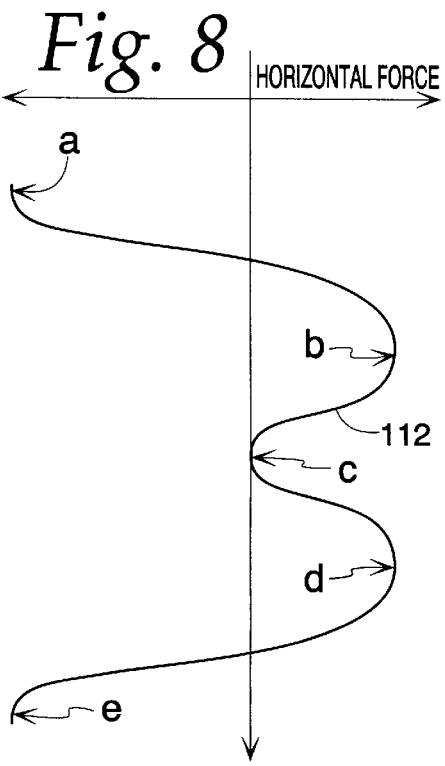
*Fig. 8*

VIBRATORY CONVEYORS

BACKGROUND OF THE INVENTION

1. Technical Field

The present invention relates to vibratory feeders or conveyors and, more particularly, to reversible or two-way vibratory feeders or conveyors.

2. Background Art

Two way vibratory feeders or conveyors have substantial applications in a variety of fields. One typical application is foundry applications. For example, castings may be delivered to the feeder at a location intermediate its ends and then the feeder is energized to feed the castings to one end or the other depending upon where it is desired to locate the castings. Typical two-way feeders include an elongated bed with an upwardly facing, generally horizontal conveying or feeding surface which terminated at opposite ends. The bed is supported on isolation springs adjacent the ends which in turn serve to mount the bed above the underlying terrain such as a floor in a factory building or the like.

Two motor and weight assemblies, which form vibration inducing systems, are secured to the bed generally centrally thereof. Each will typically include a squirrel cage motor having a rotary output shaft to which is secured an eccentrically mounted weight. Springs in the form of plastic or fiberglass slats connect each of the motors to the bed.

Each of the vibration inducing systems is canted at approximately 45 degrees to the bed but in directions oppositely of one another. When it is desired to feed in one direction, one of the vibration inducing systems is energized while the other remains quiescent. If the opposite direction of feeding is required, then the other vibration inducing system is energized while the first remains quiescent.

In many applications it is not unusual that there is a considerable disparity between the amounts of use of the two vibration inducing systems. If one system is used to the substantial exclusion of the other, so called "false Brinnelling" of the motor bearings on the unused systems will occur as a result of the vibration imparted to the bed by the first system. Lubricant may be squeezed out of the bearings as a result and when the system is finally energized, it may fail relatively quickly as a result of bearing failure.

Moreover, in foundry applications, the bed typically will be formed of metal to stand up to the continued poundings of castings. In a prior art system such as described, vertical acceleration of the feeding surface during operation will typically exceed that of gravity. As a result, after the surface has reached its highest point of movement in a cycle of vibration, it will then be accelerated downwardly more rapidly than a casting or the like conveyed by the feeder in responding to gravity. The casting will be temporarily suspended above the conveying surface but will eventually collide with it as movement of the surface begins to reverse while the casting is being moved downwardly under the influence of gravity. The result is a noise producing impact of the casting upon the metal of which the conveying surface is formed and the noise level will typically be undesirably high.

Still further, in applications requiring conveying of powders, the vertical acceleration of the feeding surface tends to fluff up the powder so that it acts as a fluidized bed on the conveyor surface. When that occurs, the powder is incapable of being conveyed.

Prior attempts to address such problems are disclosed in U.S. Pat. Nos. 3,746,149 and 5,713,457, which illustrate systems in which a single motor is used to impart vibration to a conveying surface so that it may convey in either of two directions. While the structure disclosed in U.S. Pat. No. 5,713,457 works well for its intended purpose, both of these structures, which impart a motion to the conveying surface which is substantially in the form of an elongated ellipse, involve varying degrees of complexity and associated costs. Further, these structures still impart some degree of vertical motion to the conveying surface and thereby still potentially can encounter noise problems as well as problems conveying powders such as discussed above.

It will also be appreciated that the provision of two vibration inducing systems in a single feeder or conveyor when only one is used at any given time adds considerably to the cost of the apparatus.

The present invention is directed toward overcoming one or more of the problems set forth above.

SUMMARY OF THE INVENTION

In one aspect of the present invention, a two-way drive is provided for vibrating a feeder bed in a substantially horizontal direction, including a reversible drive rotating one of two drive shafts rotatably connected so that the second drive shaft rotates at a speed which is a selected ratio which is at least twice the speed of rotation of the first. A first eccentric weight is rotatably secured to the first drive shaft, and a second eccentric weight is rotatably secured to the second drive shaft. The second eccentric weight is movable between a first position on a first shaft radius when the second shaft is driven in one direction and a second position on a second shaft radius when the second shaft is driven in the reverse direction. The first shaft radius is spaced from the second shaft radius so that the second eccentric weight in the first position is aligned with the first eccentric weight in one concurrent rotational position on one horizontal side of the drive shafts to provide a maximum force in one substantially horizontal direction when the shafts are driven in the one direction, and the second eccentric weight in the second position is aligned with the first eccentric weight in an opposite concurrent rotational position on the horizontal side opposite the one horizontal side of the drive shafts to provide a maximum force in an opposite substantially horizontal direction when the shafts are driven in the reverse direction.

In a preferred form of this aspect of the invention, the selected ratio of the rotational speed of the second drive shaft to the rotational speed of the first drive shaft is X:1, with X being an integer, and the first shaft radius and the second shaft radius are spaced apart 360/X degrees.

In a highly preferred form of this aspect of the invention, the selected ratio of rotational speed (X) is 2 and the first shaft radius and the second shaft radius are spaced apart 180 degrees.

In another preferred form of this aspect of the present invention, the second eccentric weight is freely movable between first and second stop members, where the first stop member engages the second eccentric weight when the second eccentric weight is in the first position, and the second stop member engages the second eccentric weight when the second eccentric weight is in the second position.

In still another preferred form of this aspect of the present invention, the second drive shaft includes a cage cylindrical about the second axis of rotation, and the second eccentric weight is cylindrical and freely rolls in the cage between the first and second stop members.

In still another preferred form this aspect of the present invention, $(W_1)(R_1)$ substantially equals $(W_2)(R_2)(SR)^2$, wherein $W_1$ is the mass of the first eccentric weight, $R_1$ is the first selected radial distance, $W_2$ is the mass of the second eccentric weight, $R_2$ is the second selected radial distance, and SR is the selected ratio of rotational speeds of the drive shafts.

In yet another preferred form of this aspect of the present invention, the reversible driving means is a reversible motor.

In another aspect of the present invention, the above drives are provided in combination with a longitudinally extending feeder having opposed ends and supported in a substantially horizontal orientation by an assembly permitting horizontal movement of the feeder. The drive is oriented with the drive shafts generally horizontal and transverse to the longitudinal direction of the feeder, and connected to the feeder to transmit forces in a horizontal direction.

As will further become apparent from drawings and description of the preferred embodiment, the present invention may be inexpensively and reliably used in applications requiring feeding in either of two directions. Further, the present invention will provide operation in which minimal noise will be generated. Still further, the present invention may be reliably used in applications in which powders may be conveyed.

BRIEF DESCRIPTION OF THE DRAWINGS

FIG. 4 is a diagram illustrating the sequential positioning of two eccentric weights as used with a vibratory drive according to the present invention as rotated in a clockwise direction;

FIG. 5 is a graph illustrating the horizontal forces provided by the drive in accordance with the operation illustrated in FIG. 4;

FIG. 6 is a diagram illustrating the change in relative positioning (as contrasted with position E of FIG. 5) of the two eccentric weights when the rotation of the vibratory drive is reversed to a counterclockwise direction;

FIG. 7 is a diagram illustrating the sequential positioning of two eccentric weights as used with a vibratory drive according to the present invention as rotated in a counterclockwise direction; and FIG. 8 is a graph illustrating the horizontal forces provided by the drive in accordance with the operation illustrated in FIG. 7.

DESCRIPTION OF THE PREFERRED EMBODIMENT

Figure 1:
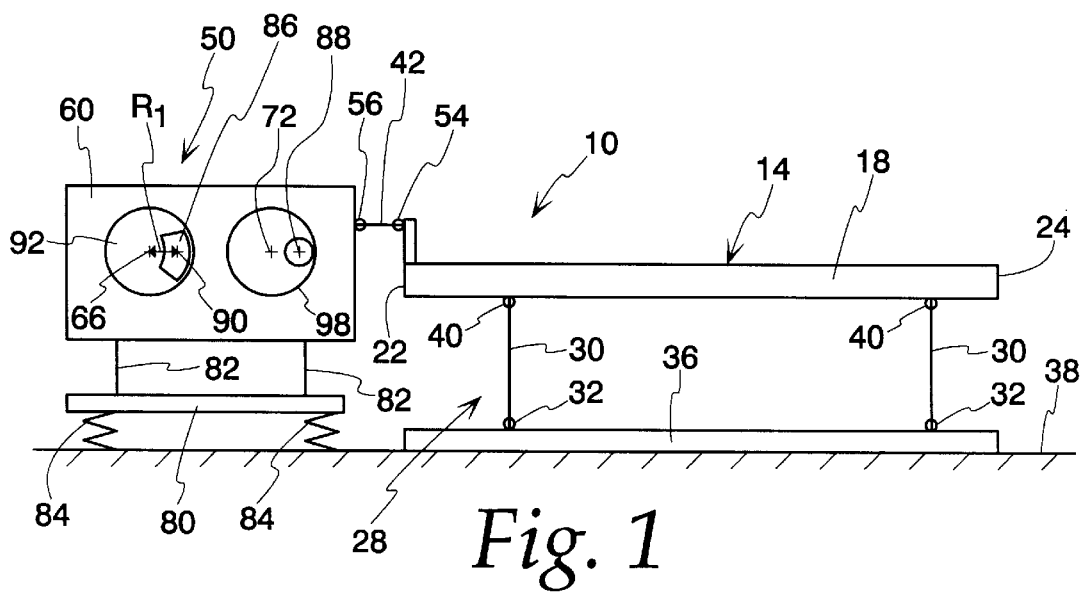
FIG. 1 is a side view of a preferred embodiment of a vibratory conveyor according to the present invention.
Figure 2:
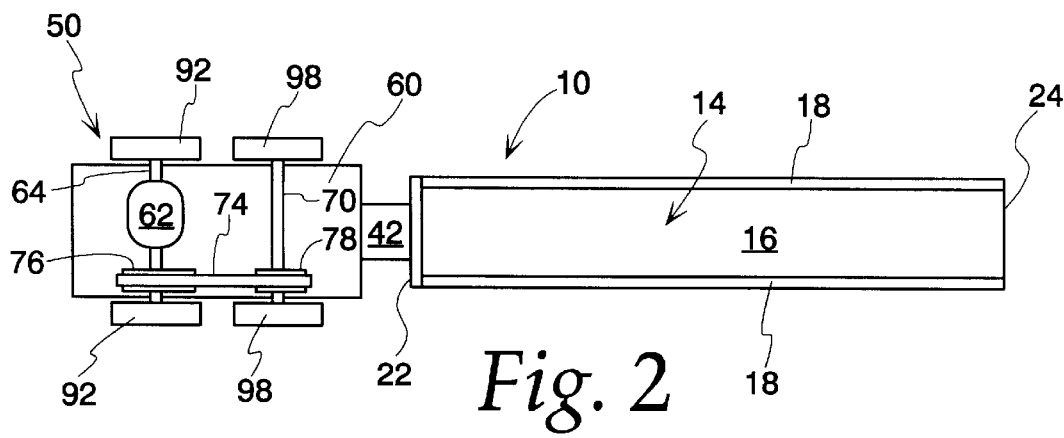
FIG. 2 is a top view of the preferred embodiment of FIG. 1.

A two-way vibratory feeder or conveyor 10 according to the present invention is shown in FIGS. 1–2. The feeder 10 includes a feeder bed 14 having a trough defined by an upwardly facing surface 16 and side walls 18, both extending longitudinally between a pair of spaced apart ends 22, 24. In a typical installation, the bed 14 could be 2 feet wide and 50 feet long, although it should be recognized that the present invention could be incorporated with virtually any size feeder bed 14.

The feeder bed 14 is supported for horizontal movement by a suitable support assembly 28. The support assembly 28 comprises a plurality of vertically oriented slats 30 oriented transversely relative to the longitudinal direction of the feeder bed 14. The slats 30 suitably support the feeder bed 14 against substantially all vertical motion while also permitting horizontal motion of the bed 14. As illustrated, the slats 30 are rigid and pivotally connected (at 32) at the bottom to a base 36 disposed on the underlying terrain or floor 38 and pivotally connected (at 40) at the top to the feeder bed 14. Alternatively, the slats 30 could be rigidly connected to the floor 38 and feeder bed 14 and bend or flex in the longitudinal direction to support the bed 14 for similar horizontal motion.

A drive connecting slat 42 connects the reversible drive 50 of the present invention to the feeder bed 14. As with the slats 30 supporting the bed 14, the connecting slat 42 may be pivotally connected at both ends (that is, at 54 to the feeder bed 14 and at 56 to the drive 50), or may be rigidly connected at both ends while bending or flexing, in either case for transmitting substantially horizontal motion only to the feeder bed 14.

The reversible drive 50 includes a housing 60 supporting a reversible motor 62 which directly drives a first drive shaft 64 for rotation about a first axis 66. The housing 60 also supports a second drive shaft 70 for rotation about a second axis 72. The two axes 66, 72 are generally horizontal and transverse to the longitudinal direction of the feeder bed 14.

The two drive shafts 64, 70 are connected by a belt drive 74 over a large gear 76 on the first drive shaft 64 and a small gear 78 on the second drive shaft 70 whereby the second drive shaft 70 is driven at a speed which is a selected ratio faster than the speed of the first drive shaft 64 as described in greater detail below. The belt drive 74 is preferably a cog belt or the like cooperating with teeth in the gears 76, 78 to prevent slippage and thereby ensure proper concurrent operation of the two drive shafts 64, 70 as also described in greater detail below. It is preferred that the rotational rate of the drive 50 be substantially greater than the natural frequency of the conveyor 10 (i.e., the natural frequency of the feeder bed 14 and drive 50).

The drive housing 60 is itself supported on a suitable base 80 in a manner permitting horizontal movement, for example by slats 82 such as described above for supporting the feeder bed 14. The base 80 is supported by vertically oriented springs 84 for damping vertical vibrations as may occur with the drive 50 as discussed below. Given the structure of the drive connecting slat 42, which transmits virtually no vertical forces, there will preferably be virtually no vertical vibration of the feeder bed 14 to dampen. Nevertheless, the drive base 80 could alternatively rest directly on the floor 38, or could be integral with the base 36 supporting the feeder bed 14 with such an integral unitary base being either directly on the floor 38 or itself supported by vertically oriented damping springs similar to springs 84.

Eccentric weights 86, 88 are supported for rotation with the drive shafts 64, 70. Similar weights are provided at both end of the drive shafts 64, 70 and operate essentially identically to one another. Therefore, the weights on only one end are described in detail below.

The eccentric weight 86 is rigidly fixed relative to the first drive shaft 64 so as to rotate with the first drive shaft 64 with its center of gravity 90 a radial distance $R_1$ from the axis 66 of the first drive shaft 64. The eccentric weight 86 is shown in a cage 92 protecting the weight 86, although it should be understood that the weight 86 could also be enclosed during rotation within the drive housing 60 to protect both the weight 86 and objects which otherwise might come into contact with the weight 86.

The other eccentric weight 88 is supported for rotation with the second drive shaft 70, with its center of gravity 94 a radial distance $R_2$ from the axis 72 of the second drive shaft 70. The eccentric weight 88 is mounted so as to have two different operational positions as described in detail hereafter. In the preferred embodiment shown in the drawings, the two positions of the eccentric weight 88 are spaced apart 180 degrees, that is, on opposite sides of the second drive shaft 70 with the center of gravity 94 lying on one of two radii 96, 97 spaced 180 degrees apart.

A preferred construction for mounting the eccentric weight 88 to operate with the two positions mentioned above is illustrated in FIG. 3. With this construction, the eccentric weight 88 is cylindrically shaped and freely rolls inside a cylindrical cage 98 which is rotated by the second drive shaft 70. Two stops 100, 102 are provided to limit the movement of the eccentric weight 88 in the cage 98. One of the stops 100 engages the weight 88 when the cage 98 rotates in one direction (direction of arrow 106) (it will be appreciated that during rotation, centrifugal force keeps the weight 88 against the cylindrical outer wall of the cage 98 with stop 100 essentially pushing the weight 88 around with the cage 98). As shown in phantom in FIG. 3, during reverse rotation of the drive shaft 70 and cage 98 (in the direction of arrow 108), the other stop 102 will engage the weight 88 to maintain it in the second position (spaced 180 degrees from the first position) relative to the second drive shaft 70.

It should be understood that still other configurations for mounting an eccentric weight 88 for two position operation such as described above could also be used within the scope of the present invention. As one example, the weight 88 could be mounted to the end of an arm extending radially from the drive shaft 70, with the arm pivotable relative to the drive shaft 70 between limits at the desired positions.

Illustrative of the one configuration in which the present invention may be used, a one horsepower reversible motor, operating at 600 rpm (driving the drive shafts 64, 70 at 600 rpm and 1200 rpm, respectively) could be used with a conveyor 10 having a natural frequency of 150 rpm.

Operation of the reversible drive 50 is illustrated in FIGS. 4–7. In these Figures, the preferred embodiment is shown in which the ratio of rotational speeds of the two drive shafts 64, 70 is 2:1. Also, as discussed in further detail below, the mass of weight 86 is about four times the mass of weight 88 so that, given their different rotational speeds, the two tend to produce equal magnitude centrifugal forces.

Referring first to operation of the two shafts in a first (clockwise) direction as shown in FIG. 4, in an initial position it will be seen that both weights 86, 88 are on the same (right) side of their axes 66, 72 and therefore are providing a maximum force toward that side (to the right). This position is shown as position A in FIG. 4.

As rotation of the drive shafts 64, 70 continues, 180 degree rotation of drive shaft 70 moves the weight 88 to the opposite side (to the left) with weight 86 being moved only 90 degrees. In this position, the force to the left is provided by only the one weight 88, with the other weight 86 providing only a vertical force which, as previously discussed, is not transmitted to the feeder bed 14. Accordingly, in this position (position B in FIG. 4), an opposite but lesser force than that occurring in position A occurs.

Another 180 degree rotation of drive shaft 70 moves the 1-5 weight 88 back to the right side, but in this position (position C in FIG. 4) the other weight 86 is on the opposite (left) side, so that the two weights 86, 88 produce opposing horizontal forces which balance one another out.

Yet another 180 degree rotation of drive shaft 70 moves weight 88 back to the opposite (left) side, with weight 86 in this position moved 90 degrees so as to be at the top. In this position (position D in FIG. 4), a force to the left is provided only by the weight 88, with the other weight 86 providing only a vertical force (similar to position B except that the vertical force is oppositely directed).

Yet another 180 degree rotation of drive shaft 70 moves both weights 86, 88 back to the one (right) side (position E in FIG. 4), essentially returning the drive 50 to the initial configuration such as position A in FIG. 4.

The horizontal forces provided by this drive 50 thus follow the curve 110 shown in FIG. 5, with continuous operation providing a continuum of such a force curve 110 (the forces provided at positions A–E of FIG. 4 are indicated by A–E in FIG. 5). This operation, with the horizontal vibratory force in one direction (at A and E) being greater than the horizontal vibratory force in the opposite direction (at B and D), provides an excellent vibratory motion for conveying materials in one direction on the feeder bed 14.

By simply reversing the direction of the motor 62, a reverse vibratory motion for conveying materials in a reverse direction can be created with the drive 50 of the present invention as illustrated by FIGS. 7 and 8.

First, FIG. 6 shows the transition of weight 88 between its different operational positions (i.e., from the first position occurring during clockwise rotation as illustrated in FIG. 4 to the second position occurring during counterclockwise rotation as illustrated in FIG. 7). That is, if the drive shaft 70 is reversed in rotation (i.e., rotated counterclockwise) from position E shown in FIG. 4, 180 degree rotation of drive shaft 70 will pivot the cage 98 to bring other stop 102 into engagement with the weight 88 while pivoting the other weight 86 ninety degrees counterclockwise. At this "initial" position, the weights 86, 88 will be in the position shown in FIG. 6.

Further counterclockwise rotation of the drive shafts 64, 70 (90 degrees for shaft 64 and weight 86 and 180 degrees for shaft 70 and weight 88) produces position "a" shown in FIG. 7, with both weights on one side of their rotational axes 66, 70, this time on the left side. Thus, in this mode of operation, the maximum horizontal force is produced toward the left.

Continued rotation in the clockwise direction thereby produces forces similar to those shown in FIGS. 4 and 5 but in an opposite direction.

That is, as counterclockwise rotation of the drive shafts 64, 70 continues, 180 degree rotation of drive shaft 70 moves the weight 88 to the opposite side (to the right) with weight 86 being moved only 90 degrees. In this position, the force to the right is provided by only the one weight 88, with the other weight 86 providing only a vertical force which, as previously discussed, is not transmitted to the feeder bed 14. Accordingly, in this position (position "b" in FIG. 7), an opposite but lesser force than that occurring in position "a" occurs.

Another 180 degree rotation of drive shaft 70 moves the weight 88 back to the left side, but in this position (position "c" in FIG. 7) the other weight 86 is on the opposite (right) side, so that the two weights 86, 88 produce opposing horizontal forces which balance one another out.

Yet another 180 degree rotation of drive shaft 70 moves weight 88 back to the opposite (right) side, with weight 86 in this position moved 90 degrees so as to be at the top. In this position (position "d" in FIG. 7), a force to the right is provided only by the weight 88, with the other weight 86 providing only a vertical force (similar to position "b" except that the vertical force is oppositely directed).

Yet another 180 degree rotation of drive shaft 70 moves both weights 86, 88 back to the one (left) side (position "e" in FIG. 7), essentially returning the drive 50 to the initial configuration such as position "a" in FIG. 7.

The horizontal forces provided by this drive 50 thus follow the curve 112 shown in FIG. 8, with continuous operation providing a continuum of such a force curve 112 (the forces provided at positions "a"–"e" of FIG. 7 are indicated by "a"–"e" in FIG. 8). This operation, with the maximum horizontal vibratory force to the left (at "a" and "e") being greater than the horizontal vibratory force in the opposite direction (at "b" and "d"), provides an excellent vibratory motion for conveying materials in the feeder bed 14 in a direction opposite that provided by the motion illustrated in FIGS. 4 and 5.

Variations to the above described drive 50 should also be recognized.

For example, although the radial distances $R_1$, $R_2$ of the centers of gravity 90, 94 are shown to be substantially equal, it should be recognized that different radial distances and different ratios of mass for the two weights 86, 88 could be used. Since the centrifugal force creating the vibratory force of the drive is a function of the square of the rotational speed of the weight, in order to substantially balance the forces when the weights 86, 88 are on opposite sides of the axes 66, 72 (positions C and c in FIGS. 4 and 7), it will be appreciated that $(W_1)(R_1)$ should substantially equal $(W_2)(R_2)(SR)^2$, where:

$W_1$ is the mass of the first eccentric weight, $W_2$ is the mass of the second eccentric weight, and SR is the selected ratio of rotational rate of the second shaft to the rotational rate of the first shaft.

Figure 3:
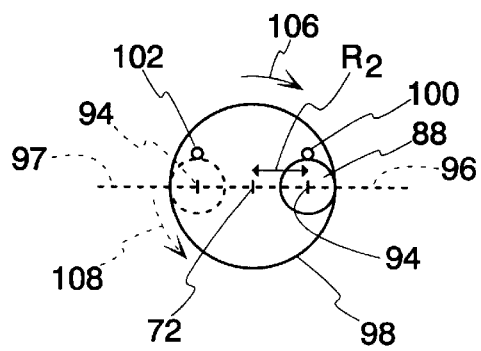
FIG. 3 is a detailed illustration of one of the eccentric weights of the vibratory drive of the present invention, showing a second position of the weight in phantom.

In the preferred embodiment shown in FIGS. 1–3, with the radial distance $R_1$ and $R_2$ to the centers of gravity 90, 94 of the two weights 86, 88 substantially equal, and the second drive shaft 70 driven at a rate which is twice the rotational rate of the first drive shaft 64, it will be appreciated that the mass of eccentric weight 86 is preferably approximately four times the mass of the eccentric weight 88. However, a wide variety of configurations could clearly be used consistent with the above.

Still further, although in the highly preferred embodiment the ratio of rotational speed between the two drive shafts 64, 70 is 2:1, still other ratios of rotational speed (X:1) could be used, where X is an integer (to ensure that the cycling of vibratory forces is repetitive) and the spacing between the two positions of the weight 88 should be 360/X degrees. Thus, for example, if the drive shaft 70 were driven at a rotational speed three times the speed of the drive shaft 64, then the stops 100, 102 should be spaced to provide operational positions of the weight 88 which are spaced apart 120 degrees.

In yet another alternate form of the present invention, a four shaft drive could be provided, with two drive shafts configured as described above and the additional two shafts configured similar to the above described two drive shafts 64, 70 but rotating in a reverse direction. Configured properly, the four weights on the four drive shafts would cooperate to provide the maximum force in either selected horizontal direction (depending on the direction of rotation), where the opposite rotational direction of the two sets of drive shafts causing the vertical forces produced by one set of two drive shafts to be substantially balanced by opposite vertical forces produced by the oppositely rotating two drive shafts.

In still another preferred embodiment, the weights 86, 88 on opposite ends of the drive shafts 64, 70 can be axially spaced, so that the distance between the drive shafts 64, 70 may be minimized to thereby also minimize the rotational couple naturally produced by operation of the drive 50.

It should thus be understood that a conveyor embodying the present invention can be reliably and inexpensively provide two-way vibratory conveying. Moreover, not only will such a drive provide such reliable operation over a long period of time, but such operation will convey a wide variety of materials, including powders, all with minimal noise.

Still other aspects, objects, and advantages of the present invention can be obtained from a study of the specification, the drawings, and the appended claims.

What is claimed is:

1. A two-way drive connectable to a feeder bed for vibrating said feeder bed in a substantially horizontal direction, comprising:

first and second drive shafts having first and second axes of rotation, respectively;

means interconnecting said first and second drive shafts for rotation of the second drive shaft at a speed which is a selected ratio of the speed of rotation of the first drive shaft, said selected ratio being at least 2:1;

reversible means for rotatably driving one of said first and second drive shafts;

a first eccentric weight rotatably secured to the first drive shaft, said first eccentric weight having a center of gravity at a first selected radial distance from the first axis of rotation;

a second eccentric weight rotatably secured to the second drive shaft, said second eccentric weight having a center of gravity at a second selected radial distance from the second axis of rotation, said second eccentric weight having a first position on a first shaft radius when said second shaft is driven in one direction and a second position on a second shaft radius when the second shaft is driven in the reverse direction, said first shaft radius being spaced from said second shaft radius whereby said second eccentric weight in said first position is aligned with said first eccentric weight in one concurrent rotational position on one horizontal side of said drive shafts to provide a maximum force in one substantially horizontal direction when said shafts are driven in said one direction, and said second eccentric weight in said second position is aligned with said first eccentric weight in an opposite concurrent rotational position on the horizontal side opposite the one horizontal side of said drive shafts to provide a maximum force in an opposite substantially horizontal direction when said shafts are driven in said reverse direction.

2. The two-way drive of claim 1, wherein said second eccentric weight is freely movable between first and second stop members, said first stop member engaging said second eccentric weight when said second eccentric weight is in said first position, said second stop member engaging said second eccentric weight when said second eccentric weight is in said second position.

3. The two-way drive of claim 2, wherein said second drive shaft includes a cage cylindrical about the second axis of rotation, and said second eccentric weight is in said cage.

4. The two-way drive of claim 3, wherein said second eccentric weight is cylindrical and freely rolls in said cage between said first and second stop members.

5. The two-way drive of claim 1, wherein said selected ratio is X:1 and X is an integer.

6. The two-way drive of claim 5, wherein said first shaft radius and said second shaft radius are spaced apart 360/X degrees.

7. The two-way drive of claim 5, wherein X is 2.

8. The two-way drive of claim 7, wherein said first shaft radius and said second shaft radius are spaced apart 180 degrees.

9. The two-way drive of claim 1, wherein $(W_1)(R_1)$ substantially equals $(W_2)(R_2)(SR)^2$, wherein:

$W_1$ is the mass of the first eccentric weight, $R_1$ is the first selected radial distance, $W_2$ is the mass of the second eccentric weight, $R_2$ is the second selected radial distance, and SR is said selected ratio.

10. The two-way drive of claim 1, wherein said reversible driving means comprises a reversible motor.

11. A two-way drive connectable to a feeder bed for vibrating said feeder bed in a substantially horizontal direction, comprising:

first and second drive shafts having first and second axes of rotation, respectively, said axes of rotation being substantially parallel;

means interconnecting said first and second drive shafts for rotation of the second drive shaft at a speed which is twice the speed of rotation of the first drive shaft;

reversible means for rotatably driving one of said first and second drive shafts;

a first eccentric weight rotatably secured to the first drive shaft, said first eccentric weight having a center of gravity at a first selected radial distance $R_1$ from the first axis of rotation;

a second eccentric weight rotatably secured to the second drive shaft, said second eccentric weight having a center of gravity at a second selected radial distance $R_2$ from the second axis of rotation, said second eccentric weight secured to said second drive shaft having a first position with its center of gravity on a first shaft radius when the drive shafts are driven in one direction and a second position with its center of gravity on a second shaft radius when the drive shafts are driven in the reverse direction, said first shaft radius being spaced 180 degrees from said second shaft radius.

12. The two-way drive of claim 11, whereby in one concurrent rotational position said centers of gravity of said first and second eccentric weights both lie on the same side of their respective axes of rotation in a substantially horizontal plane defined by said first and second axes of rotation, said weights lying on one side of their respective axes of rotation when driven in one direction and on the other side of their respective axes of rotation when driven in the reverse direction.

13. The two-way drive of claim 11, wherein $R_1$ is substantially equal to $R_2$, and the eccentric weight associated with said second drive shaft has a mass which is approximately 25% of the mass of the eccentric weight associated with said other drive shaft.

14. The two-way drive of claim 11, wherein said second eccentric weight is freely movable between first and second stop members, said first stop member engaging said second eccentric weight when said second eccentric weight is in said first position, said second stop member engaging said second eccentric weight when said second eccentric weight is in said second position.

15. The two-way drive of claim 14, wherein said second drive shaft includes a cage cylindrical about the second axis of rotation, and said second eccentric weight is in said cage.

16. The two-way drive of claim 15, wherein said second eccentric weight is cylindrical and freely rolls in said cage between said first and second stop members.

17. The two-way drive of claim 11, wherein said $W_1(R_1)$ substantially equals $4(W_2)(R_2)$, wherein $W_1$ is the mass of the first eccentric weight and $W_2$ is the mass of the second eccentric weight.

18. The two-way drive of claim 11, wherein said reversible driving means comprises a reversible motor.

19. A two-way vibratory conveyor comprising:

a feeder extending longitudinally between opposed ends and having an upwardly facing feeding surface;

a support assembly supporting said feeder longitudinally in a substantially horizontal orientation, said support assembly permitting horizontal movement of said feeder;

a vibratory drive connected to said feeder to transmit forces in a horizontal direction from said vibratory drive to said feeder, said vibratory drive including first and second drive shafts having first and second axes of rotation, respectively, said axes of rotation being parallel to one another and generally horizontal and transverse to the longitudinal direction of the feeder, means interconnecting said first and second drive shafts for rotation of the second drive shaft at a speed which is a selected ratio of the speed of rotation of the first drive shaft, said selected ratio being at least 2:1;

reversible means for rotatably driving one of said first and second drive shafts;

a first eccentric weight rotatably secured to the first drive shaft, said first eccentric weight having a center of gravity at a first selected radial distance from the first axis of rotation;

a second eccentric weight rotatably secured to the second drive shaft, said first eccentric weight having a center of gravity at a second selected radial distance from the second axis of rotation, said second eccentric weight having a first position on a first shaft radius when said second shaft is driven in one direction and a second position on a second shaft radius when the second shaft is driven in the reverse direction, said first shaft radius being spaced from said second shaft radius.

20. The two-way vibratory conveyor of claim 19, wherein:

said second eccentric weight in said first position is aligned with said first eccentric weight in one concurrent rotational position on one horizontal side of said drive shafts to provide a maximum force in one substantially horizontal direction when said shafts are driven in said one direction, and said second eccentric weight in said second position is aligned with said first eccentric weight in an opposite concurrent rotational position on the horizontal side opposite the one horizontal side of said drive shafts to provide a maximum force in an opposite substantially horizontal direction when said shafts are driven in said reverse direction.

21. The two-way drive of claim 19, wherein said second eccentric weight is freely movable between first and second stop members, said first stop member engaging said second eccentric weight when said second eccentric weight is in said first position, said second stop member engaging said second eccentric weight when said second eccentric weight is in said second position.

22. The two-way drive of claim 19, wherein said selected ratio is X:1, with X being an integer, and said first shaft radius and said second shaft radius are spaced apart 360/X degrees.

23. The two-way drive of claim 22, wherein X is 2 and said first shaft radius and said second shaft radius are spaced apart 180 degrees.

24. The two-way drive of claim 19, wherein $(W_1)(R_1)$ substantially equals $(W_2)(R_2)(SR)^2$, wherein:

$W_1$ is the mass of the first eccentric weight, $R_1$ is the first selected radial distance, $W_2$ is the mass of the second eccentric weight, $R_2$ is the second selected radial distance, and SR is said selected ratio.

25. A two-way vibratory conveyor comprising:

a feeder extending longitudinally between opposed ends and having an upwardly facing feeding surface;

a support assembly supporting said feeder longitudinally in a substantially horizontal orientation, said support assembly permitting horizontal movement of said feeder;

a vibratory drive connected to said feeder to transmit forces in a horizontal direction from said vibratory drive to said feeder, said vibratory drive including first and second drive shafts having first and second axes of rotation, respectively, said axes of rotation being substantially parallel and generally horizontal and transverse to the longitudinal direction of the feeder, means interconnecting said first and second drive shafts for rotation of the second drive shaft at a speed which is twice the speed of rotation of the first drive shaft;

reversible means for rotatably driving one of said first and second drive shafts;

a first eccentric weight rotatably secured to the first drive shaft, said first eccentric weight having a center of gravity at a first selected radial distance $R_1$ from the first axis of rotation;

a second eccentric weight rotatably secured to the second drive shaft, said second eccentric weight having a center of gravity at a second selected radial distance $R_2$ from the second axis of rotation, said second eccentric weight having a first position with its center of gravity on a first shaft radius when the drive shafts are driven in one direction and a second position with its center of gravity on a second shaft radius when the drive shafts are driven in the reverse direction, said first shaft radius being spaced 180 degrees from said second shaft radius.

26. The two-way drive of claim 25, whereby in one concurrent rotational position said centers of gravity of said first and second eccentric weights both lie on the same side of their respective axes of rotation in a substantially horizontal plane defined by said first and second axes of rotation, said weights lying on one side of their respective axes of rotation when driven in one direction and on the other side of their respective axes of rotation when driven in the reverse direction.

27. The two-way drive of claim 25, wherein $R_1$ is substantially equal to $R_2$, and the eccentric weight associated with said second drive shaft has a mass which is approximately 25% of the mass of the eccentric weight associated with said other drive shaft.

28. The two-way drive of claim 25, wherein said second eccentric weight is freely movable between first and second stop members, said first stop member engaging said second eccentric weight when said second eccentric weight is in said first position, said second stop member engaging said second eccentric weight when said second eccentric weight is in said second position.

29. The two-way drive of claim 25, wherein said reversible driving means comprises a reversible motor.

* * * * *